Figure 1:
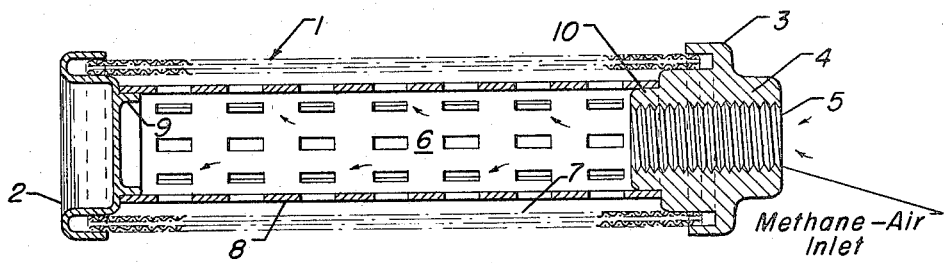

Dec. 13, 1966 V. HAENSEL 3,291,187
CATALYTIC METHANE BURNER FOR PRODUCING INFRA-RED HEAT
Filed March 2, 1964

INVENTOR:
Vladimir Haensel
BY:
*James R. Hoatson Jr.*
*Philip T. Liggett*
ATTORNEYS United States Patent Office 3,291,187
Patented Dec. 13, 1966

3,291,187
CATALYTIC METHANE BURNER FOR PRODUCING INFRA-RED HEAT
Vladimir Haensel, Hinsdale, Ill., assignor to Universal Oil Products Company, Des Plaines, Ill., a corporation of Delaware
Filed Mar. 2, 1964, Ser. No. 348,581
10 Claims. (Cl. 158—116)

The present invention relates to an improved catalytic infra-red heat producing unit and more particularly to a modified design which utilizes gas flow restricting means adjacent to and in combination with a catalytically coated gas permeable alloy element such that catalytic methane oxidation may be initiated and sustained.

Gas fed infra-red heating is particularly useful for both household and industrial applications, being preferable to electrical heating in some instances, in that the former produces infra-red heat with a longer wave length which may be absorbed more readily by some materials or surfaces. Actually, infra-red energy is considered to be an electromagnetic radiation acting in a manner similar to light waves in that energy travels at the speed of light and is reflected by shiny reflective surfaces according to the laws of optics.

A suitable active catalytic surface is effective in oxidizing a fuel-air mixture in a flameless manner such that above the black-heat temperature range the catalyzed surface will glow and provide a high temperature infra-red heat output of a relatively wide range of temperatures. With the use of propane, butane and mixtures thereof, there is little difficulty in initiating and sustaining the catalytic combustion of a gaseous fuel stream; however, with methane it has been found quite difficult to initiate and maintain the combustion reaction catalytically at temperatures below about 900° F. It appears that whenever a small amount of ignition occurs at a low temperature, it is rapidly quenched by the gas flow over or through the catalyst.

It is thus a principal object of the present invention to provide an improved catalytic infra-red heat producing unit which is adapted to effect the burning of a methane rich stream by incorporating spaced flow restricting means adjacent the upstream face of the catalyst element.

It is also an object of the present invention to provide a catalytic infra-red heat producing unit which utilizes spaced zones of catalyst particles in a flow restricting manner in combination with an all-metallic catalytic infra-red heat generating element.

When effecting the catalytic oxidation of a gaseous stream, including a methane feed, through a catalytically coated gas permeable metal gauze or screen surface, it should be realized that the over-all gas space velocity is quite high and that whenever a small amount of catalytic combustion is initiated at a low temperature level, then, as noted hereinbefore, it is generally quenched by the rapid flow of the gas stream through the catalyst element. It is particularly desirable to be able to initiate and sustain catalytic oxidation of a methane feed stream at a temperature level of 500° F. to 600° F. rather than at the 900° F. level and, in the present invention, spaced flow restricting means are used to provide a lower space velocity through one or more spaced apart portions of the catalyst element and thus preclude the snuffing-out of the catalytic oxidation being initiated at the lower temperatures.

Briefly, the present invention provides an improved apparatus design for effecting the catalytic burning of a methane rich stream to in turn provide infra-red heat generation, which comprises in combination, a gas distributing manifold section having a gas inlet port thereto and a gas permeable catalytic element extending across an outlet face therefrom, and spaced apart flow restricting means positioned adjacent the inlet face to said catalytic element, whereby there is a reduction in the gas flow rate to at least a part of the upstream portion of the catalyst element and a maintenance of the catalytic oxidation of the methane rich stream passing therethrough.

The flow restricting means utilized by the present invention may comprise various embodiments. For example, in combination with a relatively flat catalytically coated alloy metal gauze or screen providing the infra-red heat generating surface, the flow restricting means may be in the form of spaced apart plate or partitioning baffles which are positioned closely adjacent to, but upstream from the interior face of the catalytic element within a gas distributing manifold section. Thus, as the fuel air mixture enters the manifold section to be distributed uniformly across the upstream face of the catalyst element, there will be one or more flow restricting areas provided by the baffle plate means such that the resulting partially protected portions of the catalyst element will have a low velocity gas flow therethrough to in turn permit catalytic oxidation to initiate and be sustained. As catalytic oxidation continues through the restricted flow areas of the catalytic element there is an increase in heat generation from the element itself and a gradual spreading of the catalytic oxidation across the entire surface of the element. The flow restricting baffle plate means should not entirely block gas flow through the opposing portions of the catalyst element and thus should be spaced at least a short distance from the upstream face of the latter in order to merely effect a reduced flow rate into and through the shielded portions.

Where the infra-red heat producing catalyst element is of a tubular or cylindrical nature then the restricting shield may be housed concentrically within the interior of the catalytic element to similarly shield and block spaced apart upstream areas of the catalytic element. Generally, a confined interior portion of the catalyst element will be fed by fuel air mixture and serve as a distributing manifold section to in turn uniformly flow the fuel outwardly and radially through the entire surface area of the catalyst element. However, the interior spaced apart flow restricting means will serve to shield spaced portions of the catalyst element to permit a lower temperature catalytic ignition to take place as hereinbefore described for a substantially flat heat radiating element. Again, the non-perforate portions of a sleeve or other shielding means placed interiorly adjacent the upstream face of the catalyst element, should not necessarily touch the latter, but should be spaced apart in a predetermined manner such that after ignition occurs it can spread heat and catalytic oxidation across the entire surface of the element.

In a somewhat more specific embodiment, the present invention provides an infra-red heat producing apparatus for effecting the catalytic burning of a gaseous methane rich stream, which comprises, in combination, a tubular-form of gas permeable catalytic element, end closure plates across the end of said catalytic element and forming a confined cylindrical gas distributing manifold section therein, a gas inlet port means through at least one of said end closure plates to said manifold section, spaced apart flow restricting means positioned around said manifold section adjacent the inlet face of said catalytic element, whereby said methane rich stream passing said flow restricting means and entering said catalytic element will be restricted in velocity at spaced portions thereof whereby the catalytic element can initiate and sustain the catalytic combustion reaction at a reduced temperature level.

The catalyst element is preferably of an entirely metallic nature and may embody various types of temperature resistant metal gauzes as well as various types of catalytic coatings that may be used to provide a fuel oxidizing infra-red heat radiating surface; however, a preferable construction utilizes metal alloy screens of a relatively fine mesh to serve as a base material for the catalytic layer. Stainless steel mesh, such as Chromel, Nichrome, or other chrome-nickel alloys, particularly in the 30 to 70 mesh range may be used for the base for high temperature infra-red heat generating purposes. Such meshes will, of course, have small diameter wire of the order of 0.01 inch in diameter or less, although it is not intended to limit the construction of the present improved element to the use of any one predetermined size of screening wire and mesh or number of layers in the element.

The catalytic activation of the outer screen layers of the element is preferably by a noble metal deposition comprising platinum, palladium, or a platinum group metal, either alone or in combination with one or more of the other members of the group. Such metal surfaces are highly efficient oxidizing catalysts and have the ability to withstand high temperature use for a long period of time. Also, small percentages of other activating component such an thorium, ruthenium, tungsten, cesium and the like may be applied in combination with the platinum group metal. The deposition may be carried out by electroplating or other electrodeposition operation, in a manner similar to that set forth in H. R. Suter and R. J. Ruff U.S. Patent No. 2,720,494 issued October 11, 1955. This patent sets forth a means for preparing and activating alloy metal wire or screen to provide a desirable form of oxidizing or incinerating element, and it is believed unnecessary to herein set forth the detail for applying an activated coating to alloy mesh material for the present infra-red heat generating element, reference being made to the foregoing patent for the description thereof.

A particularly desirable form of flow restricting means may also be provided by the use of spaced perforate catalyst retaining sections with shallow beds of subdivided catalytic particles. In other words, a shallow bed of subdivided particles having a coating of oxidizing catalyst which is adjacent the upstream face of portions of the all-metal catalytic element can serve to reduce the flow stream velocity to the latter, as well as provide means for initiating a relatively low ignition of a methane rich stream and maintain catalytic oxidation over the adjacent portions of the catalyst element. The perforate zones containing the subdivided catalyst particles may be in spaced apart areas adjacent a relatively flat catalytic element or in spaced apart ring sections within the interior of a tubular form of all-metal catalyst elements such that the feed stream from the manifold section will inherently pass through the spaced apart zones of particulated catalyst prior to passing through adjacent sections of the infra-red heat generating metallic catalytic element. Thus, in still another embodiment the present invention provides an infra-red heat producing apparatus for effecting the catalytic burning of a gaseous methane rich stream, which comprises, in combination, a tubular form of gas permeable catalyst element, end closure plates across the end of said catalytic element forming a confined cylindrical-form gas distributing manifold section therein, gas inlet port means through at least one of the end closure plates to the manifold section, spaced apart perforate catalyst retaining sections positioned around the periphery of said manifold section and adjacent the inlet face of said catalyst element, subdivided catalyst particles having an active catalytic oxidizing coating within said retaining sections, whereby such catalyst particles in combination with and adjacent the inlet face of said catalyst element will provide a reduced gas flow rate to the latter and a low ignition temperature for sustaining catalytic oxidation of the methane rich stream.

It is not intended to limit the subdivided particles to any one type of material; however, the particles are preferably of a refractory nature capable of withstanding high temperature conditions of the order of 1600° F. or higher. Alumina, silica, silica-alumina or other conventional support materials for catalyst are desirable base materials. In addition, boria, vanadia, zirconia or other inorganic oxide materials may be suitable refractory bases for the catalyst impregnation either alone or in combination with alumina or silica, or a mixture thereof. Also various active oxidizing coatings may be impregnated onto the base particles and it is not intended to limit the present improved apparatus arrangement to any one type of catalytic coating. Various metallic components from Group VIII of the Periodic Table or more particularly from a platinum group metal may provide a highly desirable coating to provide an active oxidizing catalyst to use in combination with the all-metal catalyst element. Thus, for example, the catalyst sections may have particles in a size range from about $\frac{1}{32}$ inch to about $\frac{1}{4}$ inch, or more, and utilize a composite of alumina-platinum, alumina-silica-platinum, alumina-platinum-iron, alumina-palladium-nickel, alumina-palladium-cobalt, and the like.

Reference to the accompanying drawing and the following description in connection therewith will serve to point out advantageous features in connection with the construction and assembly of the improved form of infra-red heat apparatus particularly adapted for accommodating a methane rich stream.

FIGURE 1 of the drawing is a sectional elevational view through a tubular form of catalyst element having in turn an internal tubular baffle means for restricting flow through spaced apart portions of the catalyst element.

Figure 2:
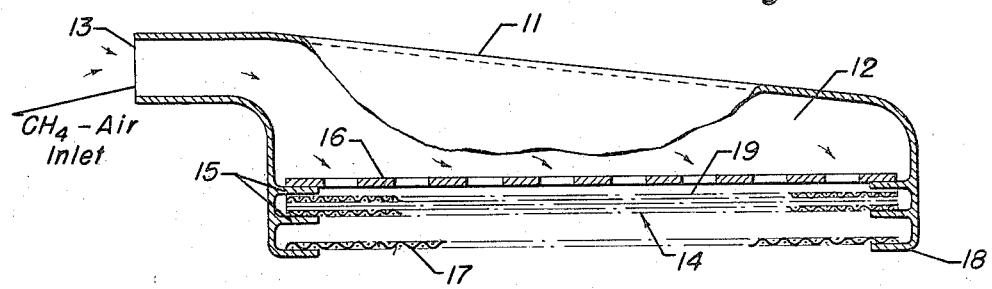

FIGURE 2 of the drawing indicates diagrammatically a sectional elevational view of a modified form of infra-red heat generating unit, where a flat baffle plate means is utilized upstream from the inlet face of a relatively flat form of catalyst element which serves as the heat generating surface of the unit.

Figure 3:
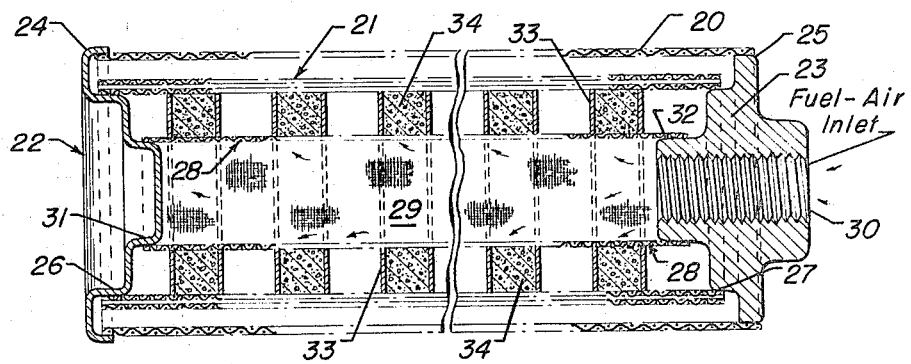

FIGURE 3 of the drawing also indicates diagrammatically and in an elevational view a modified form of a tubular form of all-metal infra-red heat generating catalyst element in combination with interiorly located zones of subdivided catalyst particles which serve to restrict flow to spaced apart portions of the all-metal catalyst element, as well as provide a low temperature ignition to the latter.

Referring now particularly to FIGURE 1 of the drawing, there is shown a unit having an external cylindrical or tubular form of metal screen catalyst element 1 which is held in place by an end closure plate member 2 and a flange section 3 on an inlet member 4. A centrally positioned threaded opening 5 in the latter provides for the introduction of a fuel-air mixture to the interior of the apparatus and to a central gas distributing manifold section 6 such that there may be a radially outward distribution of the flow stream through the catalyst element 1. As indicated diagrammatically by the drawing, the catalyst element 1 is formed of a plurality of layers of metal screens or gauzes of a relatively fine mesh, say in the 30 to 50 mesh range. At least the outer layer of the element is coated with a noble metal oxidizing catalyst layer such that the catalytic oxidation of the fuel stream will be on the outer surface of the unit and thus in a position to outwardly radiate high temperature infra-red heating. One or more of the interior layers of the element, as, for example, an inner layer 7 may also comprise a fine mesh metal gauze but shall be uncoated such that it serves entirely as a distributing screen and as a reflector screen for the infra-red heat generating coated screens around the outer portion of the element. As indicated hereinbefore, all of the screens are preferably of alloy, such as Chromel and Nichrome and the like, so as to be heat resistant.

Positioned interiorly and spaced a short distance away from the interior face of the element 1, or inner screen 7, is a perforate baffle member 8 which, in this embodiment, is of a tubular form held in place by flange members 9 on the end member 2 and by shoulder 10 on the inlet end section 4. Preferably, the non-perforate portions of the tubular member 8 are of a size to in turn block a portion of the inlet face of catalytic element 1 such that there is a reduction in gas flow rate and in gaseous space velocity for a small portion of the surface area of such element. Thus, the latter is capable of generating a catalytic oxidizing reaction on the catalyst surface without being rapidly snuffed out by a continuing high speed gas flow. Once the catalytic oxidizing reaction is sustained and heat is gradually generated on the surface of the catalyst element, then the over-all temperature increase will sustain a spreading catalytic oxidation over the entire outer surface of the catalyst element to continue an efficient substantially complete flameless burning of the methane stream. It is, of course, necessary that the internal shielding or baffling member 8 have sufficient open area to permit an overall relatively rapid flow rate for the methane-air mixture being introduced to the unit. In addition, it is preferable that the flow restricting member 8 shall not touch the outer catalyst element 1 or be so close as to preclude any gas flow through certain portions of the element. If gas flow is blocked, there will be a resulting non-uniform radiant flow from the outer surface of the element and a less efficient unit is obtained as compared to one which effects catalytic heating and radiation from the entire outer surface. The actual spacing between the outer surface of the shielding element 8 and the inner surface of the catalyst element 1 will, of course, vary with the size of the solid portions of the element 8, the space being quite close for relatively small non-perforate portions and a greater spacing when the non-perforate baffle sections comprise relatively large spaced apart areas.

Referring now to FIGURE 2 of the drawing, there is indicated an infra-red heat generating unit having a housing 11 confining an inner gas distributing manifold section 12, and having a fuel inlet passageway 13. An outer gas release face of the unit is traversed by a catalyst element 14 which is held around its periphery by suitable flange means 15. Thus, the fuel-air mixture from the interior passes to a catalyst oxidizing surface whereby there can be a resulting flameless oxidation to generate infra-red heating. Here, again, in accordance with the present invention a suitable flow restricting means 16 is provided upstream from the inlet face of the catalyst element 14 so as to reduce the gas flow to small spaced apart portions of the catalyst element to in turn permit the initiation of catalytic oxidation across the catalyst element. Thus, the baffle plate means 16 is provided with spaced apart non-perforate shielding portions and open portions at a closely spaced position adjacent the entire inner face of the catalyst element to effect the reduction in gas flow velocity to at least one or more spaced apart portions of the catalyst element itself. The shielding has the advantage of lowering the ignition temperature as well as sustaining catalytic oxidation until such time as the heat level of the unit is elevated to a temperature of 900° F. or more, at which level the methane oxidation will continue even though there be a relatively high mass velocity and space velocity through the unit.

The catalyst element 14 is again indicated as having multiple layers of alloy mesh which may be all catalytically coated, but may be preferably constructed in a manner having one or more of the outer layers catalytically coated and one or more of the inner layers non-coated such that there is a reflective effect obtained from the latter to in turn more efficiently direct all of the infra-red heat generated by the catalytic oxidation outwardly and away from the upstream part of the unit.

The embodiment of FIGURE 2 also indicates diagrammatically that an outer protector screen 17 is held in place by external flange means 18 at a spaced distance from the outer surface of the catalyst element 14. The outer screen 17 should preferably be made of a large mesh alloy screen material and of heavier gage wire strands such that the catalyst element is physically protected from contact with foreign objects. For example, the protector screen 17 shall be about 10 mesh or larger, up to ½″ x ½″ screening, whereby there will be a minimum of heat restriction or backward heat reflection to the interior of the heating unit.

Referring now to FIGURE 3 of the drawing, there is shown a cylindrical form of infra-red heating unit having an outer protector screen 20 spaced from a tubular form catalytic element 21 which in turn may comprise a plurality of layers of catalytic coated and uncoated fine mesh alloy screens held in position by an end closure plate 22 and end inlet member 23. The outer protective screen 20 is indicated as being held by suitable flange means 24 on end plate 22 and external flange 25 on end member 23. Preferably the screen utilizes a relatively heavy gage wide mesh alloy material such that it may withstand high temperature conditions but will not adversely effect, by way of backward radiation, the infra-red heat generation from the outer surface of the catalyst element 21. Here again the latter is preferably constructed from a plurality of layers of fine mesh alloy screen having at least one or more of the outer layers coated with a catalytically active oxidizing catalyst material such as platinum or palladium, whereby there may be high temperature glowing infra-red heat generation by the surface oxidation of the fuel-air stream passing radially outward from the unit. Also, one or more inner layers of the element 21 may be formed from an uncoated mesh screen so as to effect uniform distribution of the outward flow of the gaseous stream while simultaneously precluding some of the backward heat radiation from the outer catalyst surface. In the present embodiment, the element 21 is indicated as being supported by shoulder 26 on the end closure plate 22 as well as the shoulder 27 on the inlet end section 23.

Positioned internally, as a core of the unit, is a distributor screen member 28 which defines an inner gas distributing manifold section 29 being provided with fuel and air from a passageway 30 in the end member 23. Here again, the tubular member 28 is held in position by shoulder means 31 on end plate 22 and a shoulder section 32 on the inlet end member 23.

Positioned externally around the manifold section 29 and adjacent portions of the upstream face of the element 21 are a plurality of ring-like catalyst retaining sections 33 which in turn have confined particles of catalyst 34. The ring-like catalyst sections 33 are spaced apart throughout the length of the heat generating unit such that only a portion of the fuel-air stream passes radially outward from the manifold section 29 through the catalyst particles 34. The remainder of the stream passes directly through the infra-red heat producing element 21. However, in accordance with the improved construction of the present invention, there is a flow restricting effect produed by the packed sections of catalyst 34 which will reduce the stream velocity reaching the inlet face of adjacent portions of catalyst element 21. The reduced velocity at such portions permits the initiation of the catalytic oxidation reaction on the all-metal catalyst surface of the element 21 so that there is no quenching of the catalytic oxidation reaction. Subsequent heat generation maintains the catalytic oxidation reaction and permits an ultimate infra-red heat glow across the entire surface of the catalyst element 21. The flow restrictions provided by the packed catalyst beds 34 thus provide the same effect that is obtained by the perforate shielding or baffle plate means indicated in connection with FIGURES 1 and 2 of the drawing. However, the present embodiment provides an additional benefit in that suitable active oxidizing catalysts, such as an alumina-platinum catalyst, will have its own relatively low temperature ignition level for initiating the catalytic oxidation of a methane rich stream through the unit.

The combined effect of the catalytically coated subdivided particles in initiating low temperature oxidation, and as flow restricting means to provide a low space velocity through spaced portions of the catalyst element 21 will insure a relatively rapid sustained oxidation for accommodating a methane rich fuel stream to the unit. The extent of the flow restricting benefit in the present embodiment will, of course, depend upon the size of the catalyst particles 34 and the depth of the bed maintained between the inner distributing core member 29 and the interior periphery of the catalyst element 21. Relatively small tightly packed particles will provide a greater pressure drop for the radiating flow stream than will the use of larger subdivided particles where there is a resulting greater amount of voids in each of the beds.

It is not intended to limit the present embodiment to the use of any one type of perforate basket or catalyst retaining section 33 for use in combination with an all-metal infra-red heat generating catalyst element, for obviously various types of retaining sections and spacing arrangements may be utilized in combination with an outer catalyst element. For example, in addition to the embodiment of FIGURE 3, various arrangements of spaced apart geometrical forms of catalyst beds may be held in an upstream position adjacent a relatively flat catalytic screen surface, in lieu of a baffle plate member, such as set forth in FIGURE 2 of the drawing.

Still further, as noted briefly hereinbefore, there may be variations in the nature of the subdivided catalyst particles to be utilized as the flow restricting bed, with variations arising in both the supporting material and in the activating components. Where platinum or a platinum group metal is utilized as the activating component, it may be present in a small quantity of about .01% to about 0.5% by weight of the catalytic composite. In addition, an impregnation method may be incorporated in the preparation of the catalyst so as to have the catalytic surface primarily attached to the outer porous surface of the alumina or other supporting material with a minimum of penetration into the support. The surface impregnation may be of advantage to provide high initial activity for the catalyst bed. However, conversely in some instances it may be desirable to provide catalyst particles with a long life obtained by a relatively deep impregnation of the active metal onto the support. A below the surface type of impregnation may be obtained during the preparation procedure with the use of a suitable acid form of sequestering agent, such as citric acid, malic acid, phosphoric acid and the like.

Various construction means may also be embodied in connection with a modified apparatus whereby there is removability of the catalyst retaining sections from the interior of the heat producing unit. For example, suitable threaded or bolted connections at one end of a tubular form of unit, or around the periphery of a rectangular unit, may permit the withdrawal and insertion of self-contained catalyst retaining sections which are in the form of perforate baskets holding catalyst in a desired configuration and depth for use adjacent the inlet face of the catalyst element itself.

I claim as my invention:

1. Apparatus for effecting catalytic burning of a gaseous methane rich stream to provide infra-red heat generation, which comprises in combination, a gas distributing manifold section having a gas inlet port thereto and a gas permeable catalytic element comprising metallic screening coated with an oxidizing catalyst extending across an outlet face therefrom, and spaced apart flow restricting means adjacent the inlet face to said catalytic element whereby there is a reduction in the gas flow rate to at least a part of the upstream portion of the catalyst element and a maintenance of the catalytic oxidation of the methane rich stream passing therethrough.

2. The apparatus of claim 1 further characterized in that said spaced flow restricting means comprises baffle plate means positioned a short spaced distance from said inlet face of said catalytic element.

3. The apparatus of claim 1 further characterized in that said spaced flow restricting means comprising gas permeable confined particle retaining sections and subdivided particles within said sections, thereby providing reduced gas flow to spaced portions of the adjacent catalytic element.

4. The apparatus of claim 3 further characterized in that said subdivided particles within said particle retaining sections are catalytically activated with an oxidizing component, whereby to effect a low ignition temperature for the gaseous stream passing therethrough as well as a reduced flow rate through spaced portions of the adjacent catalytic element.

5. An infra-red heat producing apparatus for effecting the catalytic burning of a gaseous methane rich stream, which comprises, in combination, a confined gas distributing manifold section having a gas inlet port means thereto, a substantially flat gas permeable catalytic element positioned across an outlet face from said manifold section, said catalytic element having at least one external metallic gauze layer with an oxidizing catalytic coating whereby a gas flow therethrough will be catalytically oxidized, and spaced flow restricting means are positioned across the outlet portion of said manifold section and adjacent the upstream face of said catalytic element, such means effective for partially blocking and reducing the gas flow rate to at least a part of the surface of said element and thus provide a sustained reduced ignition temperature for the gas stream.

6. The apparatus of claim 5 further characterized in that said spaced flow restricting means comprises spaced apart baffle plate means positioned a short spaced distance from said upstream face of said catalytic element.

7. An infra-red heat producing apparatus for effecting the catalytic burning of a gaseous methane rich stream, which comprises in combination, a tubular-form of gas permeable catalytic element comprising metallic screening coated with an oxidizing catalyst, end closure plates across the end of said catalytic element and forming a confined cylindrical gas distributing manifold section therein, a gas inlet port means through at least one of said end closure plates to said manifold section, spaced apart flow restricting means positioned around said manifold section adjacent the inlet face of said catalytic element, whereby said methane rich stream passing said flow restricting means and entering said catalytic element will be restricted in velocity at spaced portions thereof, whereby the catalytic element can initiate and sustain the catalytic combustion reaction at a reduced temperature level.

8. The apparatus of claim 7 further characterized in that said flow restricting means comprises spaced perforate subdivided catalyst particles retaining sections, and subdivided catalyst particles having an active catalytic oxidizing coating are positioned therein, whereby such catalyst particles in combination with and adjacent the inlet face of said catalytic element will provide a reduced gas flow rate to the latter and a low ignition temperature for sustaining catalytic oxidation of the methane rich feed stream.

9. The apparatus of claim 7 further characterized in that said cylindrical form catalytic element comprises a plurality of high temperature resistant mesh screens having at least the outer screen coated with a metallic catalytically active component for oxidizing a methane rich gaseous hydrocarbon stream, and, in addition, at least one of the internal screens is uncoated to thereby provide an inactive heat reflective screen.

10. An infra-red heat producing apparatus for effecting the catalytic burning of a gaseous methane rich stream, which comprises in combination, a tubular-form gas permeable catalytic element comprising metallic screening coated with an oxidizing catalyst, end closure plates across the ends of said cylindrical form catalytic element, and forming a confined cylindrical gas manifold section therein, a gas inlet port means through at least one of said end closure plates to said manifold section, perforate cylindrical-form baffle means positioned internally and substantially concentrically within said catalytic element and around the periphery of said cylindrical gas manifold section with non-perforate spaced portions of said baffle means positioned a short distance from the inlet face of said catalytic element, whereby a reduced gas flow rate to opposing portions of the catalytic element will provide a sustained catalytic combustion reaction at a lower temperature level.

References Cited by the Examiner

UNITED STATES PATENTS

| | | | |
|---|---|---|---|
| 993,554 | 5/1911 | Sanford | 158—112 |
| 1,223,308 | 4/1917 | Bone et al. | 158—99 |
| 1,249,366 | 12/1917 | Fisher | 158—99 |
| 1,304,755 | 5/1919 | Ellis | 158—99 |
| 1,677,156 | 6/1928 | Vaughn. | |
| 3,008,513 | 11/1961 | Holden | 158—99 |
| 3,027,936 | 4/1962 | Lamp | 158—114 X |

FOREIGN PATENTS 9,683   11/1923   Netherlands.

FREDERICK L. MATTESON, Jr., *Primary Examiner.*

H. B. RAMEY, *Assistant Examiner.*